United States Patent
Watanabe et al.

(10) Patent No.: US 10,608,818 B2
(45) Date of Patent: Mar. 31, 2020

(54) IN-VEHICLE COMMUNICATION SYSTEM HAVING A COMPARISON MEANS FOR VERIFYING DATA AND A COMPARISON METHOD FOR VERIFYING DATA

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Masashi Watanabe, Mie (JP); Akinori Usami, Mie (JP); Naoki Adachi, Mie (JP); Tetsuya Noda, Mie (JP); Hideaki Shiranaga, Osaka (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 274 days.

(21) Appl. No.: 15/543,603

(22) PCT Filed: Jan. 16, 2015

(86) PCT No.: PCT/JP2015/051061
§ 371 (c)(1),
(2) Date: Jul. 14, 2017

(87) PCT Pub. No.: WO2016/113897
PCT Pub. Date: Jul. 21, 2016

(65) Prior Publication Data
US 2018/0006819 A1    Jan. 4, 2018

(51) Int. Cl.
*H04L 9/32* (2006.01)
*G06F 21/44* (2013.01)
(Continued)

(52) U.S. Cl.
CPC ............ *H04L 9/3226* (2013.01); *G06F 21/31* (2013.01); *G06F 21/44* (2013.01); *G06F 21/572* (2013.01);
(Continued)

(58) Field of Classification Search
CPC ... H04L 9/3226; H04L 63/00; H04L 63/0876; H04L 63/0428; H04L 9/14; H04L 63/12;
(Continued)

(56) References Cited

U.S. PATENT DOCUMENTS

2002/0136407 A1* 9/2002 Denning ................ G06F 21/10
380/258
2004/0044911 A1* 3/2004 Takada .................. G01S 5/0027
713/170
(Continued)

FOREIGN PATENT DOCUMENTS

JP  2007311960 A  11/2007
JP  2012500516 A  1/2012
(Continued)

OTHER PUBLICATIONS

Search Report for PCT/JP2015/051061, dated Feb. 17, 2015.

*Primary Examiner* — Aravind K Moorthy
(74) *Attorney, Agent, or Firm* — Honigman LLP

(57) ABSTRACT

A communication system and a comparison method for securing a communication path for a legitimate user via a terminal apparatus ("TA"). A vehicle-mounted communication device ("VMCD") transmits a device ID identifying the VMCD to a TA, acquires a terminal ID from the TA, and transmits the device ID and the terminal ID acquired from the TA to a central apparatus. The TA transmits a terminal ID identifying the TA to the VMCD, acquires a device ID from the VMCD, and transmits the terminal ID and the device ID acquired from the VMCD to the central apparatus. The
(Continued)

central apparatus receives a device ID and a terminal ID transmitted from the VMCD and a device ID and a terminal ID transmitted from the TA, and compares the device ID and the terminal ID received from the VMCD with the device ID and the terminal ID received from the TA.

8 Claims, 9 Drawing Sheets

(51) Int. Cl.
| | |
|---|---|
| *H04L 29/06* | (2006.01) |
| *G06F 21/31* | (2013.01) |
| *H04W 4/00* | (2018.01) |
| *G06F 21/57* | (2013.01) |
| *H04L 9/08* | (2006.01) |
| *H04L 9/14* | (2006.01) |
| *H04W 12/00* | (2009.01) |

(52) U.S. Cl.
CPC .............. *H04L 9/0822* (2013.01); *H04L 9/14* (2013.01); *H04L 63/00* (2013.01); *H04L 63/0428* (2013.01); *H04L 63/0876* (2013.01); *H04L 63/12* (2013.01); *H04W 4/00* (2013.01); *H04L 2209/84* (2013.01); *H04W 12/00512* (2019.01)

(58) Field of Classification Search
CPC . H04L 9/0822; H04L 2209/84; G06F 21/572; G06F 21/31; G06F 21/44; H04W 4/00; H04W 12/00512
USPC ........................................................ 380/281
See application file for complete search history.

(56) References Cited

U.S. PATENT DOCUMENTS

| | | | | |
|---|---|---|---|---|
| 2005/0177284 A1* | 8/2005 | Kugumiya | .......... | H04L 63/0428 701/1 |
| 2006/0153189 A1* | 7/2006 | Nitou | .................. | H04L 63/0428 370/389 |
| 2007/0086593 A1* | 4/2007 | Denning | ............... | H04L 9/0891 380/286 |
| 2007/0222555 A1* | 9/2007 | Tengler | ................. | H04L 9/3263 340/5.6 |
| 2009/0259841 A1* | 10/2009 | Laberteaux | ......... | H04L 63/0823 713/156 |
| 2010/0037057 A1 | 2/2010 | Shim et al. | | |
| 2011/0231652 A1* | 9/2011 | Bollay | .................. | H04L 63/166 713/153 |
| 2011/0302630 A1* | 12/2011 | Nair | ...................... | H04L 63/083 726/4 |
| 2011/0307724 A1* | 12/2011 | Shaw | ................... | G06F 21/305 713/323 |
| 2012/0095642 A1* | 4/2012 | Nishida | ................ | H04L 9/3226 701/31.4 |
| 2012/0221473 A1* | 8/2012 | Redmann | ................ | B60L 53/31 705/50 |
| 2012/0260310 A1* | 10/2012 | Kramarenko | ....... | H04L 61/1535 726/3 |
| 2013/0073859 A1* | 3/2013 | Carlson | ............... | H04L 63/0823 713/176 |
| 2013/0173112 A1* | 7/2013 | Takahashi | ............. | H04L 9/0894 701/36 |
| 2013/0174239 A1* | 7/2013 | Kim | ...................... | H04L 63/205 726/7 |
| 2013/0179689 A1* | 7/2013 | Matsumoto | ............... | G06F 8/61 713/171 |
| 2013/0231052 A1* | 9/2013 | Eling | .................. | H04L 63/0876 455/41.2 |
| 2013/0261888 A1* | 10/2013 | Nagai | ..................... | G06F 17/00 701/36 |
| 2013/0300552 A1* | 11/2013 | Chang | ...................... | B60Q 9/00 340/436 |
| 2013/0321846 A1* | 12/2013 | Hiroshige | ............ | G06K 15/408 358/1.14 |
| 2014/0114497 A1* | 4/2014 | Miyake | ..................... | H04L 9/32 701/1 |
| 2014/0155032 A1* | 6/2014 | Anson | ................... | H04W 12/06 455/411 |
| 2014/0162623 A1* | 6/2014 | Nagai | ................. | H04M 1/7253 455/419 |
| 2014/0195044 A1* | 7/2014 | McQuade | ............. | H04L 9/3215 700/237 |
| 2014/0195047 A1* | 7/2014 | King | ..................... | H04L 9/3215 700/237 |
| 2014/0297109 A1* | 10/2014 | Shimomura | .......... | H04L 67/125 701/36 |
| 2014/0304505 A1* | 10/2014 | Dawson | .............. | G06F 21/6227 713/165 |
| 2014/0359292 A1* | 12/2014 | Kawamura | ........... | H04L 9/0866 713/168 |
| 2015/0010145 A1* | 1/2015 | Iwashita | ............... | H04L 9/0861 380/44 |
| 2015/0024688 A1* | 1/2015 | Hrabak | .................... | H04W 4/80 455/41.2 |
| 2015/0149682 A1* | 5/2015 | Uemura | ................... | G06F 13/28 710/308 |
| 2015/0223069 A1* | 8/2015 | Solondz | ................ | H04W 12/08 370/329 |
| 2016/0021689 A1* | 1/2016 | Moon | ...................... | H04W 76/14 455/41.2 |
| 2016/0119145 A1* | 4/2016 | Ridd | ....................... | G06F 21/64 713/168 |
| 2016/0231421 A1* | 8/2016 | Murakami | ............ | B60R 25/245 |
| 2017/0302740 A1* | 10/2017 | Yu | ............................ | H04L 67/32 |

FOREIGN PATENT DOCUMENTS

| | | |
|---|---|---|
| JP | 2013103611 A | 5/2013 |
| JP | 2013138320 A | 7/2013 |
| JP | 2014232914 A | 12/2014 |

* cited by examiner

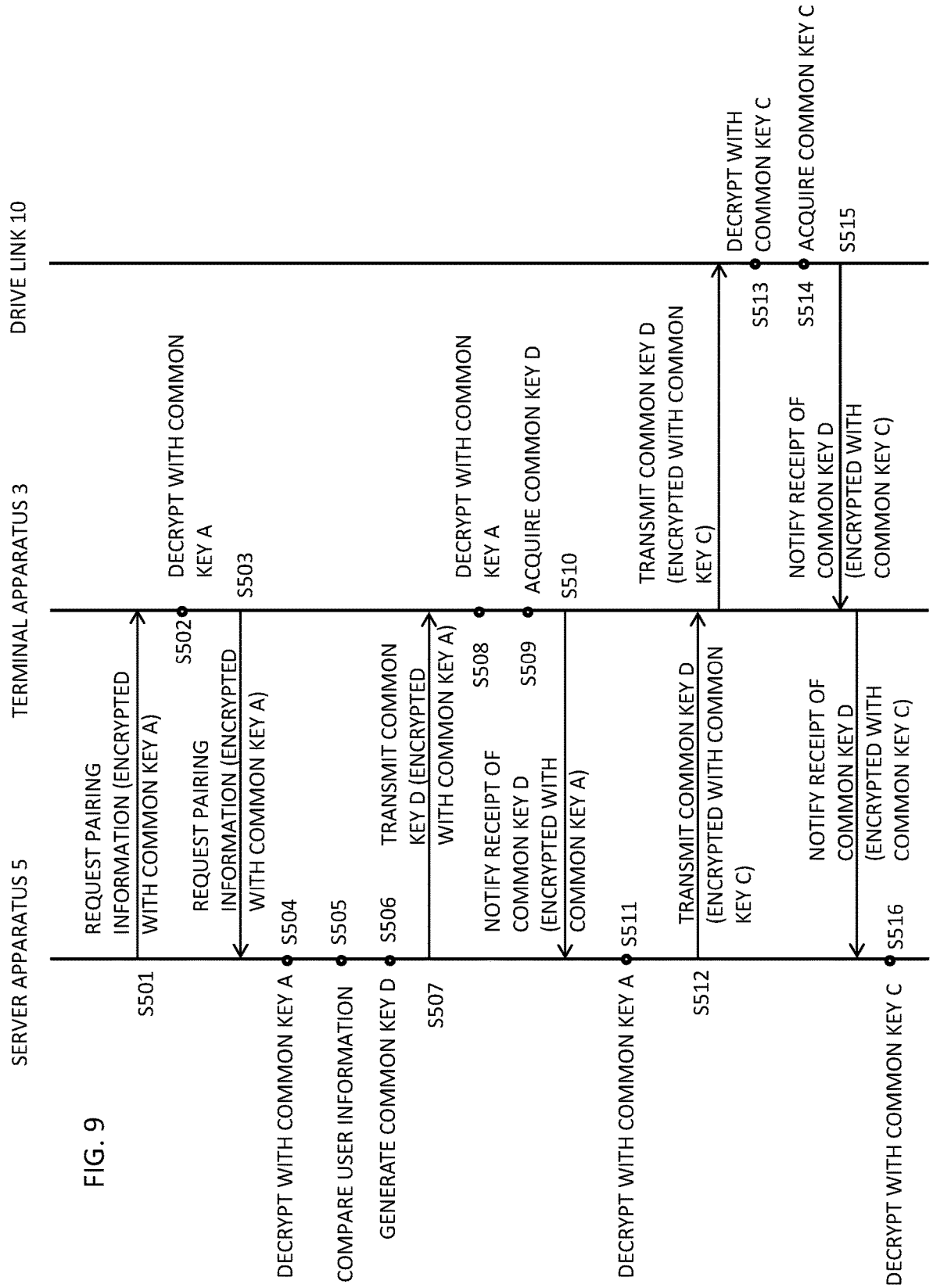

IN-VEHICLE COMMUNICATION SYSTEM HAVING A COMPARISON MEANS FOR VERIFYING DATA AND A COMPARISON METHOD FOR VERIFYING DATA

CROSS-REFERENCE TO RELATED APPLICATIONS

This application is the U.S. national stage of PCT/JP2015/051061 filed Jan. 16, 2015.

TECHNICAL FIELD

The present invention relates to a communication system and a comparison method that can secure a communication path via a terminal apparatus of a legitimate user.

BACKGROUND

Electronic devices that are mounted in vehicles have been developed to have higher functionalities. In recent years, not only electronic devices relating to cruise control, but also various electronic devices are mounted in vehicles in order to improve comfort of a user in a vehicle and to provide entertainment and the like, for example. Also, in recent years, the advancement of portable information processing terminals, such as cellular phones, smartphones, and tablet terminals, that are carried by the user has been remarkable. Systems in which processing is performed by the electronic devices in a vehicle in cooperation with these information processing terminals, and higher degree of services are provided to the user are beginning to be put to practical use.

In such vehicle-mounted electronic devices having higher functionalities, programs to be executed are also developed to have higher functionalities, and there are cases where the programs need to be updated to the next version. Also, there are cases where necessary functions differ from user to user, and the convenience is considered to be improved by enabling selection or customization of functions according to the preference of the user. In such cases, the addition or modification of programs may be needed. Therefore, in recent vehicle-mounted electronic devices, technologies that enable the addition, update, or the like of programs are under consideration and development, and there are devices that have adopted a technology called OSGi (Open Services Gateway initiative), for example.

A system for using a portable device that is networked in a vehicle, using the OSGi technology, has been proposed in JP 2012-500516T. In this system, a portable device client program installed in a vehicle-mounted device performs communication with the portable device, and dynamic transfer of an application program from the portable device to the vehicle-mounted device is performed. Execution of an application program that uses constituent elements such as a display and a speaker of the vehicle is possible on the vehicle-mounted device or the portable device.

However, if a vehicle-mounted electronic device is configured such that addition, update and the like of a program is made possible, then there is a concern that a program generated by a malicious third party is added and executed. Accordingly, there is a concern that information that is transmitted and received through an in-vehicle network is leaked to the outside by an unauthorized program, for example.

The present invention was made in view of the above-described circumstances, and an object thereof is to provide a communication system and a comparison method that can secure a communication path via a terminal apparatus of a legitimate user in order to prevent information leak to the outside or the like from occurring due to unauthorized access to the in-vehicle network.

SUMMARY

A communication system according to the present invention includes a vehicle-mounted communication device connected to a communication network in a vehicle, a terminal apparatus detachably connected to the vehicle-mounted communication device, and a central apparatus that is connected to a communication network outside the vehicle and that can communicate with the terminal apparatus. The vehicle-mounted communication device includes: a means for storing a device ID for identifying the vehicle-mounted communication device; a means for transmitting the device ID to the terminal apparatus; a means for acquiring a terminal ID, from the connected terminal apparatus, for identifying the terminal apparatus; and a means for transmitting the device ID and a terminal ID that was acquired from the terminal apparatus to the central apparatus via the terminal apparatus. The terminal apparatus includes: a means for storing a terminal ID for identifying the terminal apparatus; a means for transmitting the terminal ID to the vehicle-mounted communication device; a means for acquiring a device ID transmitted from the vehicle-mounted communication device; and a means for transmitting the terminal ID and a device ID that was acquired from the vehicle-mounted communication device to the central apparatus. The central apparatus includes: a means for receiving a device ID and a terminal ID that were transmitted from the vehicle-mounted communication device and a device ID and a terminal ID that were transmitted from the terminal apparatus; and a comparison means for comparing the device ID and the terminal ID that were received from the vehicle-mounted communication device with the device ID and the terminal ID that were received from the terminal apparatus.

In the communication system according to the present invention, the vehicle-mounted communication device and the central apparatus store a first common key that is shared between them, the vehicle-mounted communication device includes a means for encrypting, with the first common key, the device ID and the terminal ID that are to be transmitted to the central apparatus, the terminal apparatus and the central apparatus store a second common key that is shared between them, the terminal apparatus includes a means for encrypting, with the second common key, the terminal ID and the device ID that are to be transmitted to the central apparatus, and the central apparatus includes: a means for decrypting, with the first common key, the device ID and the terminal ID that were received from the vehicle-mounted communication device; and a means for decrypting, with the second common key, the terminal ID and the device ID that were received from the terminal apparatus.

In the communication system according to the present invention, the central apparatus includes: a generating means for generating, if determining, using the comparison means, that the device ID and the terminal ID that were received from the vehicle-mounted communication device match the device ID and the terminal ID that were received from the terminal apparatus, a third common key that is shared between the central apparatus, the terminal apparatus, and the vehicle-mounted communication device; a means for encrypting, with the first common key, the third common key generated by the generation means; a means for transmitting the third common key that was encrypted with the first common key to the vehicle-mounted communication device via the terminal apparatus; a means for encrypting, with the second common key, the third common key generated by the generation means; and a means for transmitting the third common key that was encrypted with the second common key to the terminal apparatus.

In the communication system according to the present invention, the central apparatus includes: a means for transmitting, if determining, using the comparison means, that the device ID and the terminal ID that were received from the vehicle-mounted communication device do not match the device ID and the terminal ID that were received from the terminal apparatus, a notification that communication with the terminal apparatus should be cut off to the vehicle-mounted communication device via the terminal apparatus, and the vehicle-mounted communication device includes a means for cutting off, upon receiving the notification transmitted from the central apparatus, the communication with the terminal apparatus.

A comparison method according to the present invention compares a vehicle-mounted communication device connected to a communication network in a vehicle with a terminal apparatus detachably connected to the vehicle-mounted communication device using a central apparatus that is connected to a communication network outside the vehicle and that can communicate with the terminal apparatus. The vehicle-mounted communication device is configured to transmit a device ID for identifying the vehicle-mounted communication device to the terminal apparatus, acquire a terminal ID, from the connected terminal apparatus, for identifying the terminal apparatus, and transmit the device ID and a terminal ID that was acquired from the terminal apparatus to the central apparatus via the terminal apparatus. The terminal apparatus is configured to transmit a terminal ID for identifying the terminal apparatus to the vehicle-mounted communication device, acquire a device ID transmitted from the vehicle-mounted communication device, and transmit the terminal ID and a device ID that was acquired from the vehicle-mounted communication device to the central apparatus. The central apparatus is configured to receive a device ID and a terminal ID that were transmitted from the vehicle-mounted communication device and a device ID and a terminal ID that were transmitted from the terminal apparatus, and compare the device ID and the terminal ID that were received from the vehicle-mounted communication device with the device ID and the terminal ID that were received from the terminal apparatus.

In the comparison method according to the present invention, the vehicle-mounted communication device is configured to encrypt, with a first common key that is shared with the central apparatus, the device ID and the terminal ID that are to be transmitted to the central apparatus, the terminal apparatus is configured to encrypt, with a second common key that is shared with the central apparatus, the terminal ID and the device ID that are to be transmitted to the central apparatus, and the central apparatus is configured to decrypt, with the first common key, the device ID and the terminal ID that were received from the vehicle-mounted communication device, and decrypt, with the second common key, the terminal ID and the device ID that were received from the terminal apparatus.

In the comparison method according to the present invention, the central apparatus is configured to generate, if, as a result of comparison, determining that the device ID and the terminal ID that were received from the vehicle-mounted communication device match the device ID and the terminal ID that were received from the terminal apparatus, a third common key that is to be shared between the central apparatus, the terminal apparatus, and the vehicle-mounted communication device, encrypt, with the first common key, the generated third common key, transmit the third common key that was encrypted with the first common key to the vehicle-mounted communication device via the terminal apparatus, encrypt, with the second common key, the generated third common key, and transmit the third common key that was encrypted with the second common key to the terminal apparatus.

In the comparison method according to the present invention, the central apparatus is configured to transmit, if, as a result of comparison, determining that the device ID and the terminal ID that were received from the vehicle-mounted communication device do not match the device ID and the terminal ID that were received from the terminal apparatus, a notification that communication with the terminal apparatus should be cut off to the vehicle-mounted communication device via the terminal apparatus, and the vehicle-mounted communication device is configured to cut off, upon receiving the notification transmitted from the central apparatus, the communication with the terminal apparatus.

According to the present invention, as a result of the central apparatus comparing the device ID and the terminal ID that were received from the vehicle-mounted communication device with the device ID and the terminal ID that were received from the terminal apparatus, whether or not the combination of the vehicle-mounted communication device and the terminal apparatus is an authorized combination is determined.

Also, according to the present invention, a configuration is adopted in which the vehicle-mounted communication device encrypts, with the first common key that is shared with the central apparatus, the device ID and the terminal ID that are to be transmitted to the central apparatus, and the terminal apparatus encrypts, with the second common key that is shared with the central apparatus, the terminal ID and the device ID that are to be transmitted to the central apparatus, and as a result, unauthorized rewriting of information needed for the comparison in a middle of the communication path can be prevented.

Also, according to the present invention, a configuration is adopted in which, as a result of comparison, if the device ID and the terminal ID that were received from the vehicle-mounted communication device are determined to match the device ID and the terminal ID that were received from the terminal apparatus, the third common key is generated, the third common key that is encrypted with the first common key is transmitted to the vehicle-mounted communication device, the third common key that is encrypted with the second common key is transmitted to the terminal apparatus, and as a result, unauthorized rewriting of the third common key in a middle of the communication path can be prevented, and the communication path between the vehicle-mounted communication device, the terminal apparatus, and the central apparatus can be established.

Also, according to the present invention, as a result of comparison, if the device ID and the terminal ID that were received from the vehicle-mounted communication device are determined to not match the device ID and the terminal ID that were received from the terminal apparatus, the communication between the vehicle-mounted communication device and the terminal apparatus is cut off, and as a result, an unauthorized terminal apparatus can be prevented from being connected to the communication path.

According to the present application, as a result of the central apparatus comparing the device ID and the terminal ID that were received from the vehicle-mounted communication device and the device ID and the terminal ID that were received from the terminal apparatus, whether or not the combination of the vehicle-mounted communication device and the terminal apparatus is an authorized combination can be determined. Also, a configuration is adopted in which, if the combination of the vehicle-mounted communication device and the terminal apparatus is determined to be an authorized combination, a common key that is to be shared between the three devices is transmitted to the vehicle-mounted communication device in a state in which the common key is concealed from the terminal apparatus, and the common key is transmitted to the terminal apparatus in a state in which the common key is concealed from the vehicle-mounted communication device, and as a result, unauthorized rewriting of the common key in a middle of the communication path can be prevented, and the communication path between the three devices can be established.

BRIEF DESCRIPTION OF DRAWINGS

FIG. 9 is a flowchart illustrating a procedure for establishing a communication path between three devices.

DETAILED DESCRIPTION OF PREFERRED EMBODIMENTS

Hereinafter, the present invention will be specifically described based on the drawings illustrating an embodiment of the invention.

Figure 1:
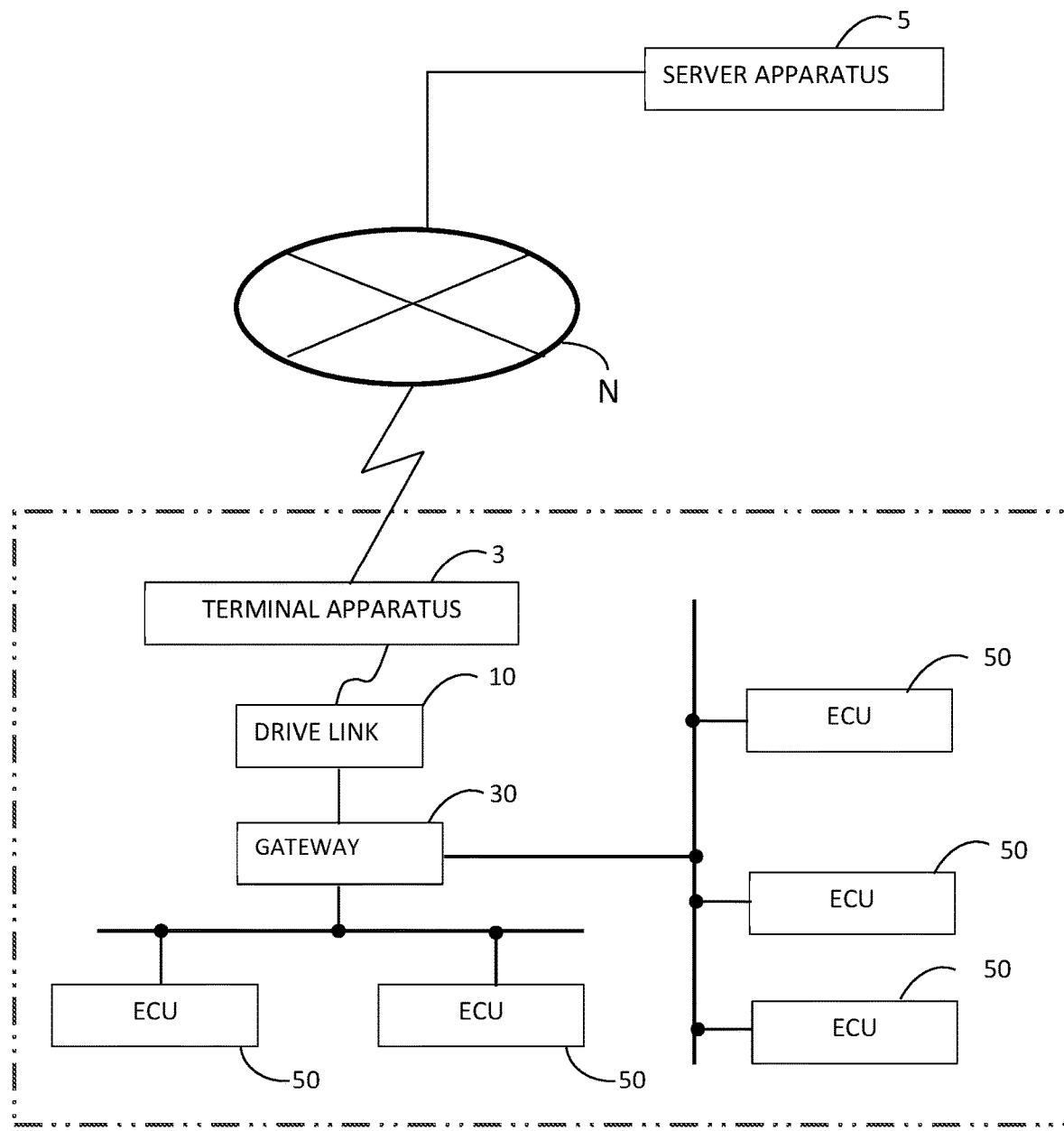
FIG. 1 is a schematic diagram illustrating a configuration of a communication system according to a present embodiment.

FIG. 1 is a schematic diagram illustrating a configuration of a communication system according to the present embodiment. In the diagram, a reference numeral 1 designating the portion surrounded by the dash-dotted line denotes a vehicle, and a drive link 10, a gateway 30, a plurality of ECUs (Electronic Control Units) 50, and the like are installed in the vehicle 1. In the vehicle 1, there are a plurality of communication groups that are each constituted by a plurality of ECUs 50 that are bus-connected to a common communication line, and the gateway 30 relays the communication between the communication groups. Therefore, a plurality of communication lines are connected to the gateway 30. Also, the gateway 30 is connected to the drive link 10, transmits information from the drive link 10 to the ECUs 50, and gives information received from the ECUs 50 to the drive link 10.

The drive link 10 has functionality for relaying communication between the terminal apparatus 3 carried by a user or various server apparatuses 5 and an in-vehicle network of the vehicle 1 constituted by the gateway 30, the ECUs 50, and the like, and is connected to the gateway 30. The terminal apparatus 3 is an apparatus such as a cellular phone, a smartphone, a tablet terminal, or a notebook PC (Personal Computer) that is carried by the user, and performs communication by wire with the drive link 10. The server apparatus 5 is connected to a wide area wireless network N such as a public cellular phone network, and performs communication with the drive link 10 via the terminal apparatus 3.

Figure 2:
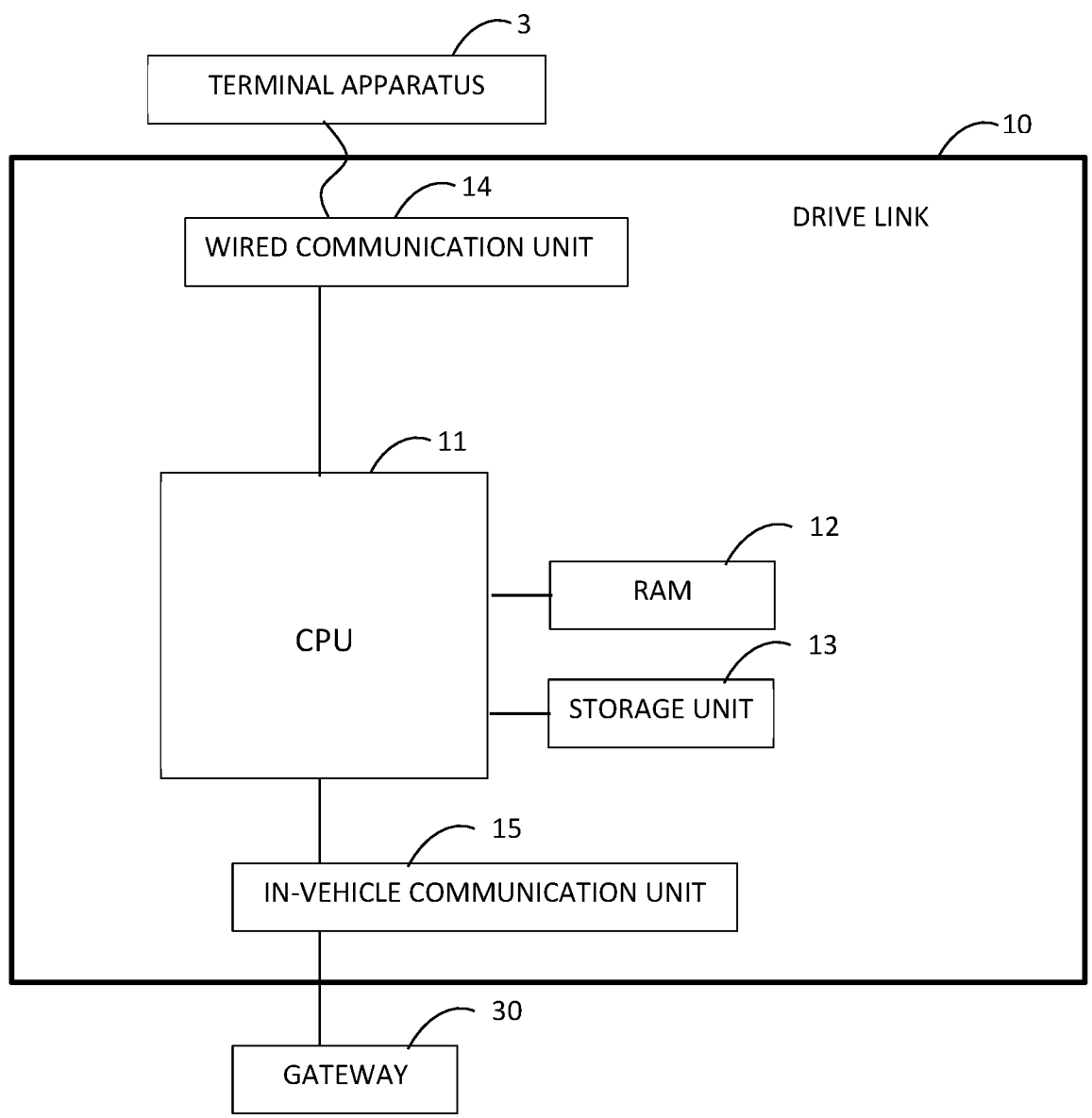
FIG. 2 is a block diagram illustrating an internal configuration of a drive link.

FIG. 2 is a block diagram illustrating the internal configuration of the drive link 10. The drive link 10 is constituted by a CPU (Central Processing Unit) 11, a RAM (Random Access Memory) 12, a storage unit 13, a wired communication unit 14, an in-vehicle communication unit 15, and the like.

The CPU 11 causes the drive link 10 to function as a vehicle-mounted communication device according to the present invention by reading out one or more programs stored in the storage unit 13 to the RAM 12 and executing the programs. The CPU 11 can execute a plurality of programs in parallel by switching the plurality of programs in a time division manner, for example. The RAM 12 is constituted by a memory element such as an SRAM (Static RAM) or a DRAM (Dynamic RAM), and temporarily stores programs executed by the CPU 11, data necessary for execution, and the like.

The storage unit 13 is configured using a nonvolatile memory element such as a flash memory or an EEPROM (Electrically Erasable Programmable Read Only Memory), a magnetic storage device such as a hard disk, or the like. The storage unit 13 includes a storage region for storing programs executed by the CPU 11, data necessary for executing the programs, and the like.

The wired communication unit 14 includes a connector for connecting a communication cable or the like, and performs communication with the terminal apparatus 3 via the connected communication cable. The wired communication unit 14 performs communication conforming to a standard such as USB (Universal Serial Bus) or RS232C, for example. The wired communication unit 14 transmits information given from the CPU 11 to the terminal apparatus 3 and gives information received from the terminal apparatus 3 to the CPU 11.

The in-vehicle communication unit 15 is connected to the gateway 30 installed in the vehicle 1 via a communication cable. The in-vehicle communication unit 15 performs communication with the gateway 30 conforming to a standard such as CAN (Controller Area Network) or LIN (Local Interconnect Network), for example. The in-vehicle communication unit 15 transmits information given from the CPU 11 to the gateway 30 and gives information received from the gateway 30 to the CPU 11.

Figure 3:
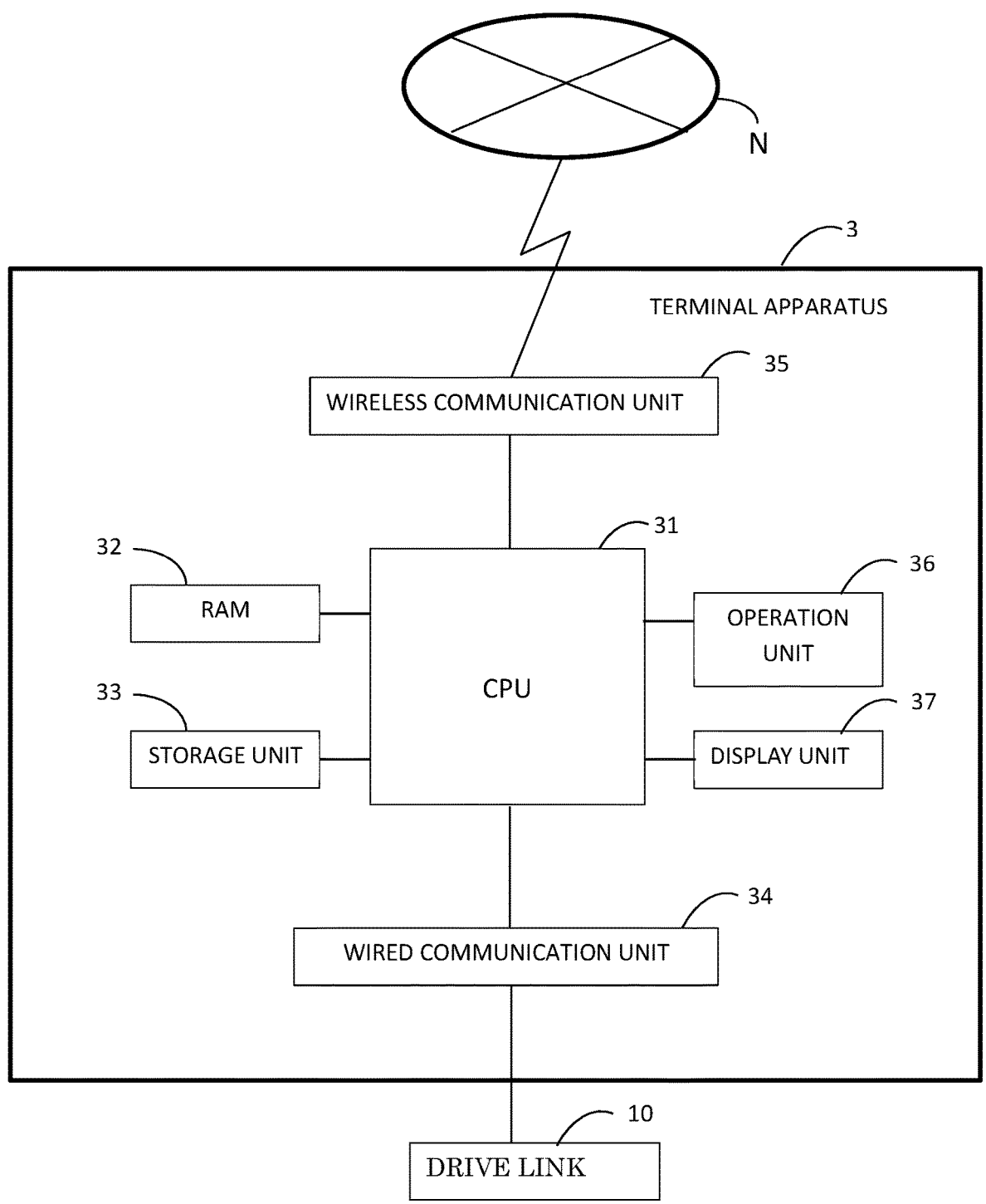
FIG. 3 is a block diagram illustrating an internal configuration of a terminal apparatus.

FIG. 3 is a block diagram illustrating an internal configuration of a terminal apparatus 3. The terminal apparatus 3 is constituted by a CPU 31, a RAM 32, a storage unit 33, a wired communication unit 34, a wireless communication unit 35, an operation unit 36, a display unit 37, and the like.

The CPU 31 controls the operation of the units of hardware described above by reading out one or more programs pre-stored in the storage unit 33 to the RAM 32 and executing the programs, and causes the entire apparatus to function as a terminal apparatus according to the present invention. The RAM 32 is constituted by a memory element such as an SRAM or a DRAM, and temporarily stores programs executed by the CPU 31, data necessary for executing the programs, and the like.

The storage unit 33 is configured using a nonvolatile memory element such as a flash memory or an EEPROM, a magnetic storage device such as a hard disk, or the like. An application program for certifying that the user is a legitimate user or the like is installed in the storage unit 33.

The wired communication unit 34 includes a connector for connecting a communication cable or the like, and performs communication with the drive link 10 via the connected communication cable. The wired communication unit 34 performs communication conforming to a standard such as USB or RS232C, for example. The wired communication unit 34 transmits information given from the CPU 31 to the drive link 10 and gives information received from the drive link 10 to the CPU 31.

The wireless communication unit 35 is configured using an auxiliary circuit that executes processing relating to an antenna and the communication therethrough, for example, and includes functionality for connecting to a wide area wireless network N such as a public cellular phone network and executing communication processing. The wireless communication unit 35 transmits information given to it by the CPU 31 to an external apparatus such as a server apparatus 5 via a wide area wireless network N formed by a base station that is not shown in the diagram, and gives information received from the external apparatus via the wide area wireless network N to the CPU 31.

The operation unit 36 is an interface for operations by the user, and is constituted by various types of buttons, switches, touch panels, and the like. The display unit 37 is constituted by a liquid crystal display panel, an organic EL (Electro Luminescence) display panel, or the like, and displays information entered via the operation unit 36, information acquired through the wired communication unit 34 and the wireless communication unit 35, and the like.

Figure 4:
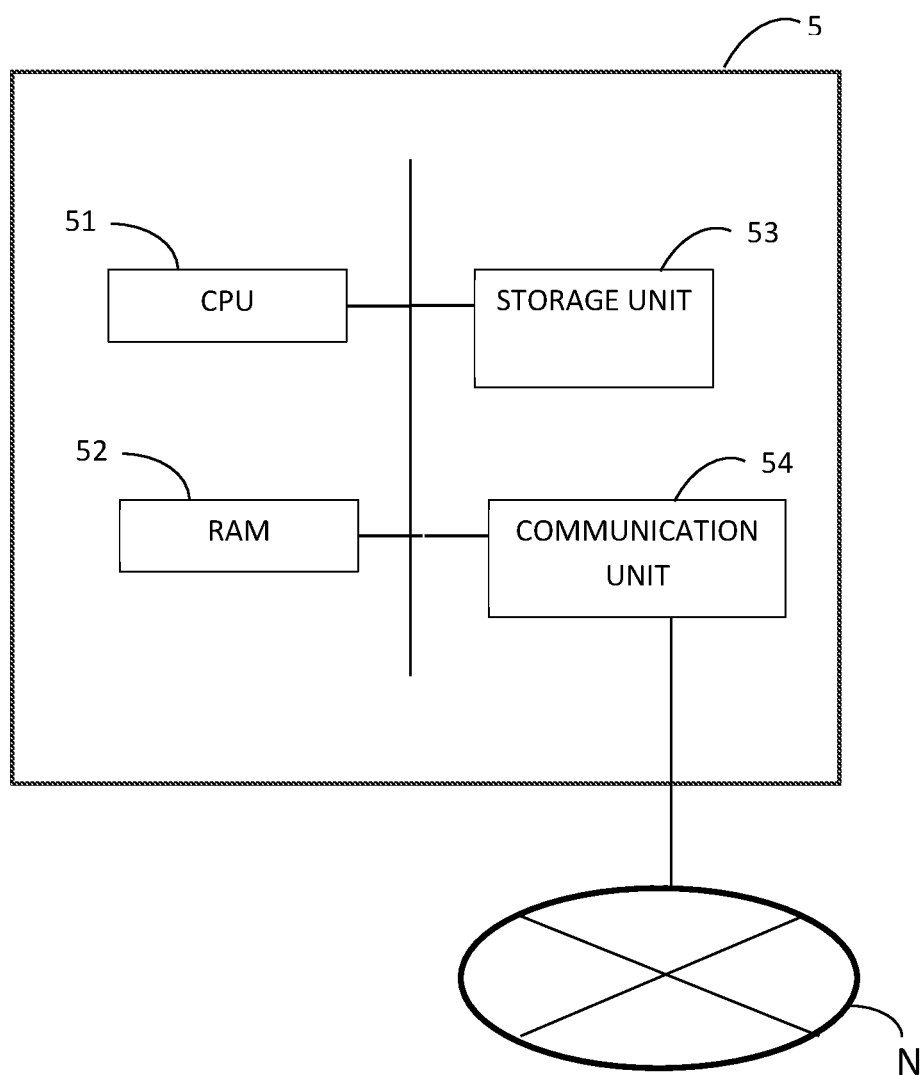
FIG. 4 is a block diagram illustrating an internal configuration of a server apparatus.

FIG. 4 is a block diagram illustrating an internal configuration of the server apparatus 5. The server apparatus 5 includes a CPU 51, a RAM 52, a storage unit 53, a communication unit 54, and the like, for example.

The CPU 51 control the operation of the units of hardware described above by reading out one or more programs pre-stored in the storage unit 53 to the RAM 52 and executing the programs, and causes the server apparatus 5 to function as a central apparatus according to the present invention. The RAM 52 is constituted by a memory element such as an SRAM or a DRAM, and temporarily stores programs executed by the CPU 51, data necessary for execution, and the like.

The storage unit 53 is configured using a nonvolatile memory element such as a flash memory or an EEPROM, a magnetic storage device such as a hard disk, or the like. Pairing information indicating combination of drive links 10 and terminal apparatuses 3, user information including login IDs of users and passwords, and the like are stored in the storage unit 53.

The communication unit 54 is configured using an auxiliary circuit that executes processing relating to communication, for example, and has functionality for connecting to the wide area wireless network N such as the public cellular phone network, and executing communication processing. The communication unit 54 transmits information given to it by the CPU 51 to the external apparatus such as the terminal apparatus 3 and gives information received from the external apparatus to the CPU 51 via the wide area wireless network N.

The drive link 10 according to the present embodiment is configured such that a program to be executed by the CPU 11 can be added, updated, deleted, and the like. For example, if the user runs a car navigation program on a terminal apparatus 3 in which a GPS receiver is installed, and uses the terminal apparatus 3 as a car navigation apparatus, then an accurate vehicle position can be calculated as a result of the terminal apparatus 3 acquiring speed information and the like of the vehicle 1. Therefore, the user can add (that is "install"), to the drive link 10, a program that acquires speed information and the like of the vehicle 1 and transmits the acquired information to the terminal apparatus 3, in cooperation with the car navigation program of the terminal apparatus 3.

For example, the drive link 10 can be configured such that addition, update, deletion, and the like of a program can be performed by adopting OSGi technology. OSGi is a system that manages dynamic addition, execution, and the like of programs called bundles. An OSGi framework that is the execution framework for a bundle operates in the CPU 11. Note that OSGi is an existing technology, and therefore a detailed description thereof is omitted. Also, the drive link 10 may perform addition, update, deletion, and the like of programs by adopting a technology other than OSGi.

When an addition instruction for adding a program is given by the terminal apparatus 3, or an addition instruction based on an operation by the user is given by an operation unit (unshown) or the like provided in the vicinity of the driver's seat of the vehicle 1, the CPU 11 of the drive link 10 performs processing for adding the program. The drive link 10 may acquire the program to be added from the programs stored in the terminal apparatus 3, for example, or may acquire the program from the server apparatus 5 and the like via the terminal apparatus 3. The CPU 11 of the drive link 10 stores the program acquired from the terminal apparatus 3, the server apparatus 5, or the like to the storage unit 13. Thereafter, the CPU 11 can read out the added program from the storage unit 13, execute the program, and perform processing relating to the program as needed.

Also, the CPU 11 of the drive link 10 updates programs that have been already stored in the storage unit 13 for the purpose of functionality expansion, bug fix, or the like, for example. Updating a program may be performed when an update instruction is given from the operation unit of the vehicle 1, the terminal apparatus 3, or the like, for example, or the CPU 11 may update a program autonomously by regularly performing communication with the server apparatus 5 or the like and determining whether or not an update of the program is needed, for example. The CPU 11 of the drive link 10 updates a program by rewriting some of or all of the program stored in the storage unit 13 based on the update information (such as an update program and data) acquired from the terminal apparatus 3, the server apparatus 5, or the like.

Also, the CPU 11 of the drive link 10 deletes programs stored in the storage unit 13. For example, when a delete instruction to delete a program is given from the operation unit of the vehicle 1, the terminal apparatus 3, or the like, the CPU 11 deletes the program from the storage unit 13.

In this way, the drive link 10 according to the present embodiment is configured such that the user can add, update, etc. programs as necessary, and as a result there is a concern that a program created by a malicious third party may be added to the drive link 10, and the program is executed by the CPU 11. Therefore, in the present embodiment, in order to prevent an unauthorized access by an unauthorized program to the vehicle 1 from occurring, the communication path between three devices, namely the server apparatus 5, the terminal apparatus 3, and the drive link 10, is established after verifying, in the server apparatus 5, that the combination of the terminal apparatus 3 and the drive link 10 is an authorized combination.

Hereinafter, the procedure for establishing the communication path will be described.

The storage unit 13 of the drive link 10 is assumed to store a device ID for identifying the drive link 10, and the storage unit 33 of the terminal apparatus 3 is assumed to store an apparatus ID for identifying the terminal apparatus 3. Also, the vender of the drive link 10 notifies the purchaser (user) of a temporary login ID and a temporary password, and registers, to the server apparatus 5, the device ID of the drive link 10, and the temporary login ID and the temporary password that are notified to the user.

Furthermore, it is assumed that the server apparatus 5 has generated a secret key and a public key (referred to as secret key A and public key A), and acquired an electronic certificate (referred to as electronic certificate A) from a certification authority (CA), which is not shown in the diagram, as a result of the secret key and the public key having been certified by the certification authority. Similarly, it is assumed that the vender of the drive link 10 has generated a secret key and a public key (referred to as secret key B and public key B), received certification thereof from the certification authority, and written an acquired electronic certificate (referred to as electronic certificate B) to the drive link 10.

Figure 5:
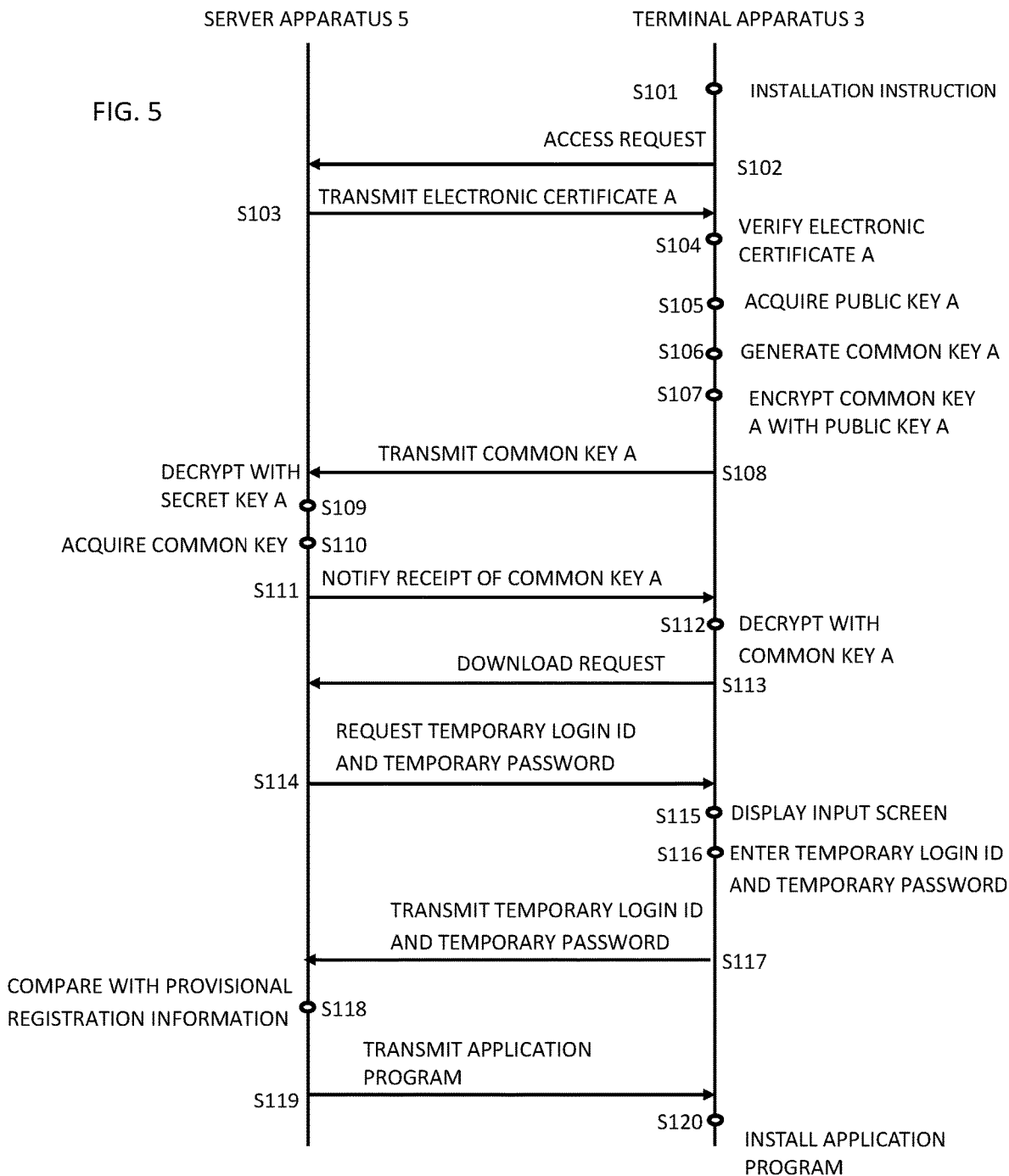
FIG. 5 is a flowchart illustrating an installation procedure of an application program for user authentication.

The user who purchased the drive link 10 from the vendor downloads an application program for user authentication from the server apparatus 5, and installs the application program in the terminal apparatus 3, as a prior preparation. FIG. 5 is a flowchart illustrating an installation procedure of the application program for user authentication. After an instruction indicating that the application for user authentication needs to be installed (step S101) has been entered with the operation unit 36, the terminal apparatus 3 requests access to the server apparatus 5 via the wireless communication unit 35 (step S102).

Upon receiving the access request from the terminal apparatus 3, the server apparatus 5 sends the electronic certificate A to the terminal apparatus 3 (step S103).

Upon receiving the electronic certificate A from the server apparatus 5, the terminal apparatus 3 verifies the electronic certificate A with a CA public key (step S104), and acquires the public key A (step S105). Here, if not having the CA public key, the terminal apparatus 3 acquires the CA public key from the certification authority.

Next, the terminal apparatus 3 generates a common key (referred to as common key A) to be used with the server apparatus 5 (step S106), and stores the generated common key A in the storage unit 33. Also, the terminal apparatus 3 encrypts the generated common key A with the public key A (step S107), and transmits the encrypted common key A to the server apparatus 5 from the wireless communication unit 35 (step S108).

Upon receiving the encrypted common key A transmitted from the terminal apparatus 3 with the communication unit 54, the server apparatus 5 decrypts the encrypted common key A with the secret key A (step S109), and acquires the common key A (step S110). The server apparatus 5 stores the acquired common key A in the storage unit 53, encrypts a receipt notification that the common key A has been received with the common key A, and transmits the encrypted receipt notification to the terminal apparatus 3 (step S111). The server apparatus 5 acquires the common key A in step S110, and as a result, the server apparatus 5 and the terminal apparatus 3 can execute communication which is encrypted with the common key A. In the description below, even in a case of not being specifically mentioned, the communication between the server apparatus 5 and the terminal apparatus 3 is encrypted with the common key A.

The terminal apparatus 3 decrypts the receipt notification received from the server apparatus 5 with the common key A (step S112), and requests downloading of the application for user authentication to the server apparatus 5 (step S113). Upon receiving the download request, the server apparatus 5 requests input of the temporary login ID and the temporary password to the terminal apparatus 3 in order to determine whether or not the request is from a legitimate user (step S114).

Upon receiving the request of inputting the temporary login ID and the temporary password, the terminal apparatus 3 displays an input screen of the temporary login ID and the temporary password in the display unit 37 (step S115), and receives input of the temporary login ID and the temporary password that have been given by the vendor in advance with the operation unit 36 (step S116). Then, the terminal apparatus 3 transmits the temporary login ID and the temporary password that have been entered with the operation unit 36 to the server apparatus 5 (step S117).

Upon receiving the temporary login ID and the temporary password that have been transmitted from the terminal apparatus 3, the server apparatus 5 compares them with the temporary login ID and the temporary password that were pre-registered (provisional registration information) (step S118), and if they both coincide, transmits the application program for user authentication to the terminal apparatus 3 (step S119).

The terminal apparatus 3 installs the application program received from the server apparatus 5 to the storage unit 33 (step S120).

In the present flowchart, as described above, a method is adopted in which, when the application program for user authentication is downloaded, only a legitimate user can install the application program as a result of using the temporary login ID and the temporary password that have been issued from the vender of the drive link 10, and therefore, arbitrary installation of an application program by a third party is prevented.

Figure 6:
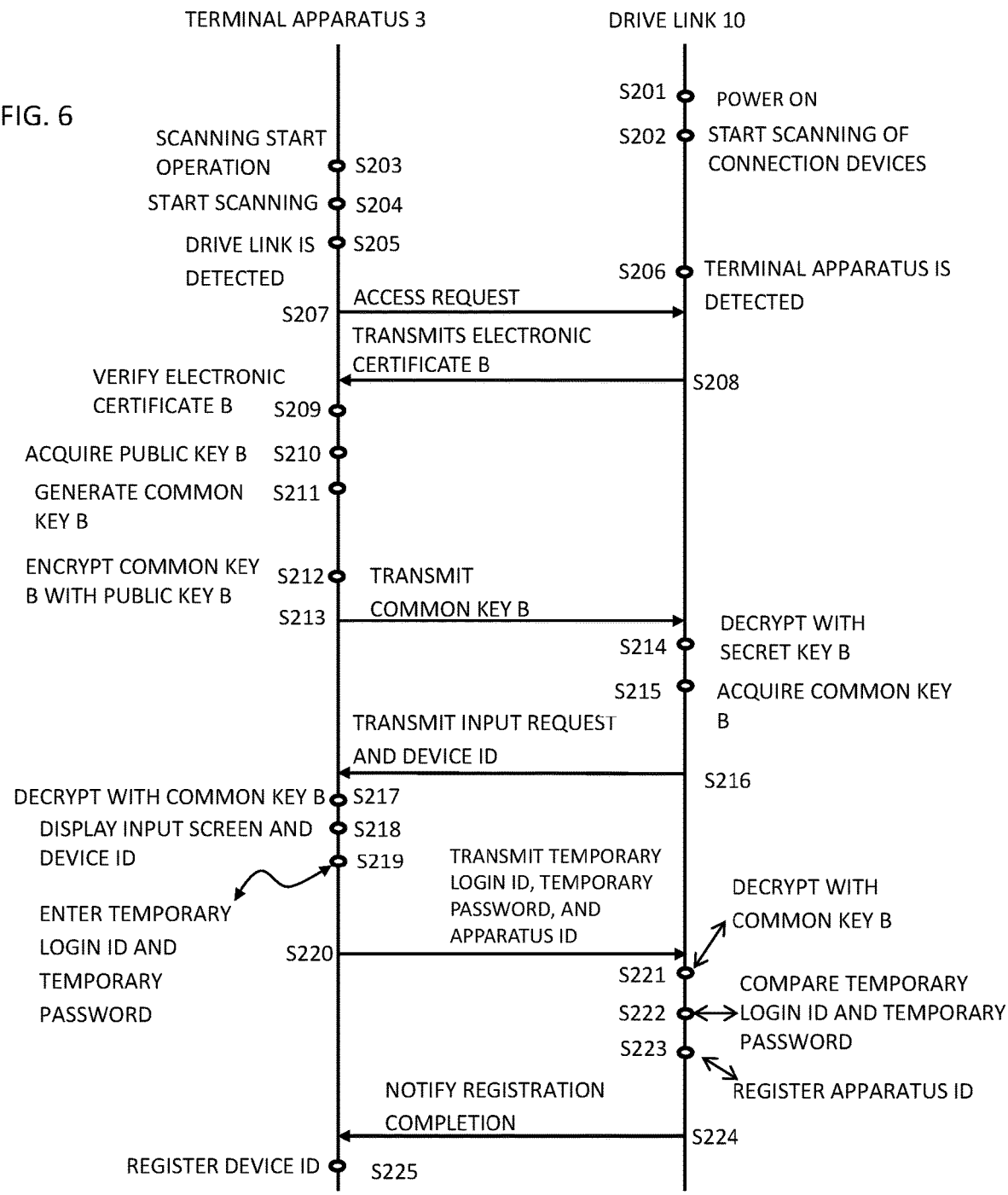
FIG. 6 is a flowchart illustrating a procedure of processing executed by the terminal apparatus and the drive link when pairing is performed.

After completing the installation of the application program for user authentication, the user connects the terminal apparatus 3 to the drive link 10, and performs pairing of the terminal apparatus 3 and the drive link 10. FIG. 6 is a flowchart illustrating a procedure of processing executed by the terminal apparatus 3 and the drive link 10 when pairing is performed.

When power is supplied to the drive link 10 (step S201), the CPU 11 of the drive link 10 starts scanning of connection devices via the wired communication unit 14 (step S202).

Meanwhile, the terminal apparatus 3 connected to the drive link 10 receives, with the operation unit 36, an operation to activate the application program for user authentication and an operation to start scanning of the drive link 10 (step S203). Upon receiving these operations, the CPU 31 of the terminal apparatus 3 activates the application program for user authentication stored in the storage unit 33, and starts scanning of connection devices via the wired communication unit 34 (step S204).

When the terminal apparatus 3 and the drive link 10 are connected correctly with a communication cable, the terminal apparatus 3 detects the drive link 10 as the connection device (step S205), and the drive link 10 detects the terminal apparatus 3 as the connection device (step S206).

Next, the terminal apparatus 3 requests access to the drive link 10 via the wired communication unit 34 (step S207). Upon receiving the access request from the terminal apparatus 3, the drive link 10 transmits the electronic certificate B to the terminal apparatus 3 (step S208). Upon receiving the electronic certificate B transmitted from the drive link 10, the terminal apparatus 3 verifies the electronic certificate B with the CA public key (step S209), and acquires the public key B (step S210).

Next, the terminal apparatus 3 generates a common key (referred to as common key B) that is to be used with the drive link 10, which is a pairing target (i.e. a device with which the terminal apparatus 3 is to be paired) (step S211), and stores the generated common key B in the storage unit 33. Also, the terminal apparatus 3 encrypts the generated common key B with the public key B (step S212), and transmits the encrypted common key B to the drive link 10 (step S213).

Upon receiving the encrypted common key B transmitted from the terminal apparatus 3, the drive link 10 decrypts the encrypted common key B with the secret key B (step S214), and acquires the common key B (step S215). The drive link 10 stores the acquired common key B in the storage unit 13, encrypts, with the common key B, the device ID of the drive link 10 and an input request of the temporary login ID and the temporary password, and transmits the encrypted data to the terminal apparatus 3 (step S216). As a result of the drive link 10 acquiring the common key B in step S215, the drive link 10 and the terminal apparatus 3 can execute communication which is encrypted with the common key B. In the description below, even in a case of not being specifically mentioned, the communication between the drive link 10 and the terminal apparatus 3 is encrypted with the common key B.

The terminal apparatus 3 decrypts, with the common key B, the device ID of the drive link 10 and the input request of the temporary login ID and the temporary password that have been received from the drive link 10 to which the terminal apparatus 3 is connected (step S217), and displays the device ID and an input screen of the temporary login ID and the temporary password in the display unit 37 (step S218). The temporary login ID and the temporary password are entered into the terminal apparatus 3 with the operation unit 36 (step S219), and the terminal apparatus 3 transmits the entered temporary login ID and temporary password and an apparatus ID for identifying the terminal apparatus 3 to the drive link 10 (step S220).

Upon receiving the temporary login ID and the temporary password that have been transmitted from the terminal apparatus 3 in response to the input request and the apparatus ID of the terminal apparatus 3, the drive link 10 decrypts the received data with the common key B (step S221), and compares them with the temporary login ID and the temporary password that were pre-registered by the vender (step S222). If the result of the comparison is that they both coincide, then the CPU 11 of the drive link 10 registers the apparatus ID by storing the apparatus ID received from the terminal apparatus 3 in the storage unit 13 (step S223).

Next, the drive link 10 notifies the terminal apparatus 3 that the registration of the apparatus ID has been completed (step S224). Upon receiving the notification of registration completion transmitted from the drive link 10, the CPU 31 of the terminal apparatus 3 registers the device ID by storing the device ID of the drive link 10 to which the terminal apparatus 3 has been connected in the storage unit 33 (step S225).

As described above, in the present flowchart, a configuration is adopted in which the device ID is displayed in the display unit 37 of the terminal apparatus 3 carried by a legitimate user, and as a result, a legitimate user can perform pairing after confirming the drive link 10 to which the terminal apparatus 3 is to be connected. Also, as a result of inputting the temporary login ID and the temporary password that are known only to legitimate users of the terminal apparatus 3, and the drive link 10 performing comparison, it can be confirmed that the registration is performed by a legitimate user.

Figure 7:
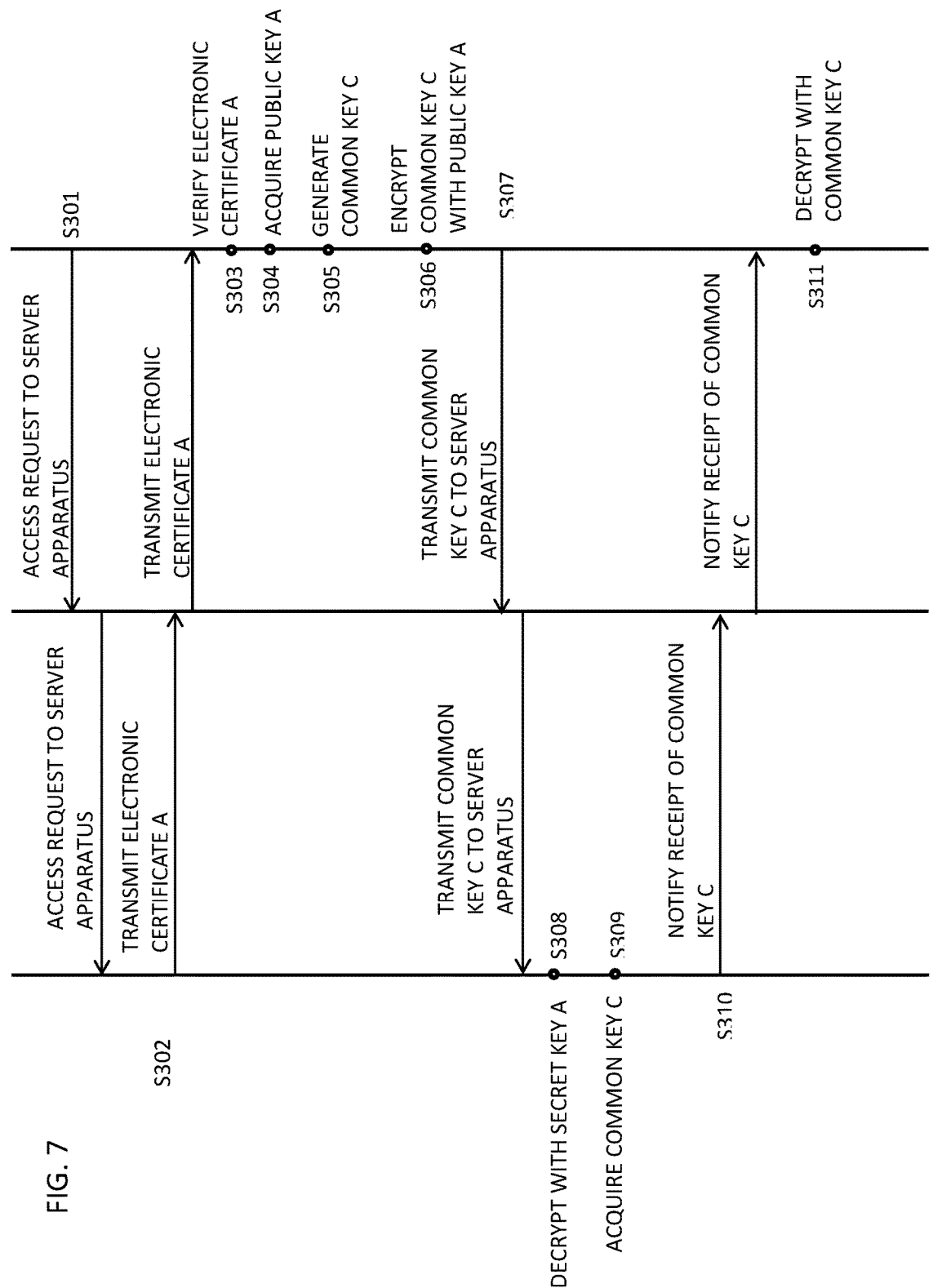
FIG. 7 is a flowchart illustrating a generation procedure of a common key to be used between the drive link and the server apparatus.

After completing the pairing of the drive link 10 and the terminal apparatus 3, a common key to be used between the drive link 10 and the server apparatus 5 is generated. FIG. 7 is a flowchart illustrating a generation procedure of the common key to be used between the drive link 10 and the server apparatus 5. In the present embodiment, no direct communication path between the drive link 10 and the server apparatus 5 is provided, and therefore, the drive link 10 requests access to the server apparatus 5 via the terminal apparatus 3 (step S301).

Upon receiving the access request from the drive link 10, the server apparatus 5 transmits the electronic certificate A described above to the drive link 10 via the terminal apparatus 3 (step S302).

Upon receiving the electronic certificate A transmitted from the server apparatus 5, the drive link 10 verifies the electronic certificate A with the CA public key (step S303), and obtains the public key A (step S304). Here, if not having the CA public key, the drive link 10 acquires the CA public key from the certification authority.

Next, the drive link 10 generates a common key (referred to as common key C) to be used with the server apparatus 5 (step S305), and stores the generated common key C in the storage unit 13. Also, the drive link 10 encrypts the generated common key C with the public key A (step S306), and transmits the encrypted common key C to the server apparatus 5 via the terminal apparatus 3 (step S307).

Upon receiving the encrypted common key C transmitted from the drive link 10, the server apparatus 5 decrypts the encrypted common key C with the secret key A (step S308), and acquires the common key C (step S309). The server apparatus 5 stores the acquired common key C in the storage unit 53, encrypts a receipt notification that the common key C has been received with the common key C, and transmits the encrypted receipt notification to the drive link 10 via the terminal apparatus 3 (step S310).

Upon receiving the receipt notification transmitted from the server apparatus 5, the drive link 10 decrypts the receipt notification with the common key C (step S311).

In the present flowchart, the common key C to be used between the server apparatus 5 and the drive link 10 is generated, and the common key C is shared by the server apparatus 5 and the drive link 10, and as a result, the communication between the server apparatus 5 and the drive link 10 can be encrypted with the common key C. That is, the server apparatus 5 and the drive link 10 can perform communication therebetween in a state in which the communication is concealed from the terminal apparatus 3 connected to the drive link 10.

Figure 8:
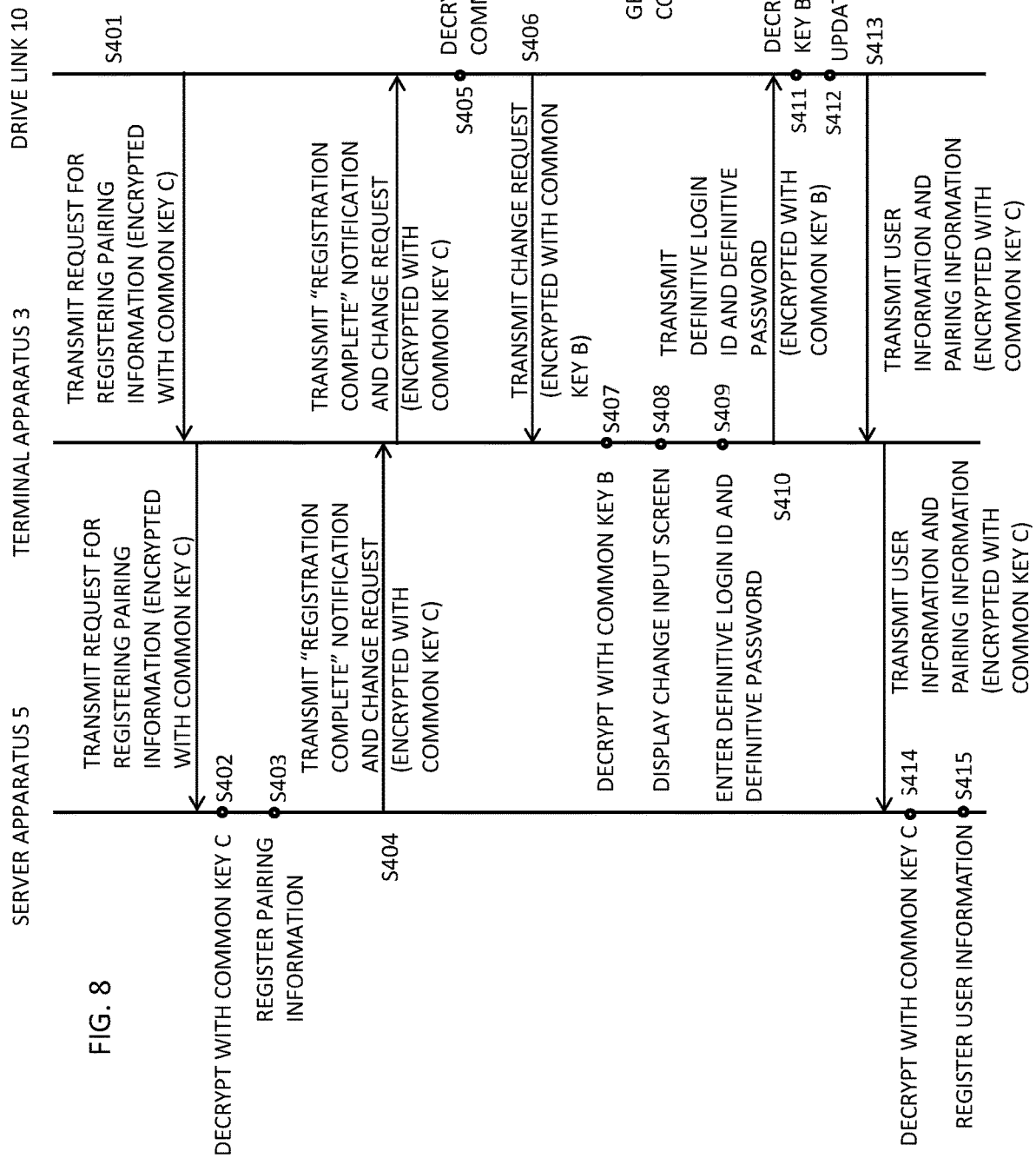
FIG. 8 is a flowchart illustrating a registration procedure of user information.

Next, definitive registration of user information is performed. FIG. 8 is a flowchart illustrating a registration procedure of the user information. The drive link 10 encrypts, with the common key C, a registration request for requesting registration of the pairing information that includes the device ID of the drive link 10 and the apparatus ID acquired from the terminal apparatus 3 to which the drive link 10 was connected when pairing was performed, and the temporary login ID and the temporary password stored in the storage unit 13, and transmits the encrypted registration request to the server apparatus 5 via the terminal apparatus 3 (step S401).

Upon receiving the registration request from the drive link 10, the server apparatus 5 decrypts the registration request with the common key C (step S402), and registers the pairing information by storing the obtained pairing information in the storage unit 53 (step S403). Next, the server apparatus 5 encrypts, with the common key C, a "registration complete" notification that the pairing information has been registered and a change request for requesting to change to a definitive login ID and a definitive password, and transmits the encrypted data to the drive link 10 via the terminal apparatus 3 (step S404).

Upon receiving the "registration complete" notification and the change request from the server apparatus 5, the drive link 10 decrypts the "registration complete" notification and the change request with the common key C (step S405), and performs a change request, to the terminal apparatus 3, for requesting to change to a definitive login ID and a definitive password (step S406). Note that the change request performed by the drive link 10 to the terminal apparatus 3 is transmitted to the terminal apparatus 3 after being encrypted with the common key B.

The terminal apparatus 3 decrypts the change request transmitted from the drive link 10 with the common key B (step S407). Next, the CPU 31 of the terminal apparatus 3 displays a change input screen of the definitive login ID and the definitive password in the display unit 37 (step S408), and receives the definitive login ID and the definitive password that are input using the operation unit 36 (step S409). The terminal apparatus 3 stores the definitive login ID and the definitive password that have been received with the operation unit 36 in the storage unit 33, encrypts them with the common key B, and transmits the encrypted data to the drive link 10 (step S410).

The drive link 10 decrypts, with the common key B, the definitive login ID and the definitive password that have been transmitted from the terminal apparatus 3 (step S411), and updates the user information by overwriting the temporary login ID and the temporary password that have been registered with the definitive login ID and the definitive password (step S412). The drive link 10 encrypts, with the common key C, the user information (definitive login ID and definitive password) and the pairing information (device ID and apparatus ID), and transmits the encrypted data to the server apparatus 5 via the terminal apparatus 3 (step S413).

The server apparatus 5 decrypts, with the common key C, the user information and the pairing information that have been transmitted from the drive link 10 (step S414), and registers the user information by storing the user information in the storage unit 53 in association with the pairing information that has already been registered (step S415).

In the present flowchart, the pairing information stored in the drive link 10 can be registered to the server apparatus 5 in a state in which the information is concealed from the terminal apparatus 3.

Next, the procedure for establishing, after the server apparatus 5 has verified that the combination of the terminal apparatus 3 and the drive link 10 is an authorized combination, the communication path between three devices, namely the server apparatus 5, the terminal apparatus 3, and the drive link 10, will be described.

FIG. 9 is a flowchart illustrating a procedure for establishing the communication path between the three devices. The server apparatus 5 encrypts, with the common key A, a transmission request for requesting transmission of the pairing information, and transmits the encrypted request to the terminal apparatus 3 (step S501).

The terminal apparatus 3 decrypts, with the common key A, the transmission request transmitted from the server apparatus 5 (step S502), encrypts, with the common key A, the pairing information including the apparatus ID of the terminal apparatus 3 and the device ID acquired from the drive link 10 to which the terminal apparatus 3 is connected, and transmits the encrypted pairing information to the server apparatus 5 (step S503).

Upon receiving the pairing information transmitted from the terminal apparatus 3 in response to the transmission request, the server apparatus 5 decrypts the pairing information (step S504), and compares the pairing information with the pairing information acquired from the drive link 10 when the definitive registration of the user information was performed (step S505). If the server apparatus 5 determines that, as a result of comparison, the pairing information acquired from the terminal apparatus 3 matches the pairing information acquired from the drive link 10, the server apparatus 5 generates a common key (referred to as common key D) that is common to the three devices (step S506).

The server apparatus 5 encrypts, with the common key A, the generated common key D, and transmits the common key D to the terminal apparatus 3 (step S507). Upon receiving the common key D transmitted from the server apparatus 5, the terminal apparatus 3 decrypts, with the common key A (step S508), the common key D, and acquires the common key D (step S509). The CPU 31 of the terminal apparatus 3 stores the acquired common key D in the storage unit 33.

The terminal apparatus 3 encrypts, with the common key A, a receipt notification that the common key D has been received, and transmits the receipt notification to the server apparatus 5 (step S510). The server apparatus 5 decrypts, with the common key A, the receipt notification from the terminal apparatus 3 (step S511).

Also, the server apparatus 5 encrypts, with the common key C, the common key D, and transmits the encrypted common key D to the drive link 10 via the terminal apparatus 3 (step S512). Upon receiving the common key D transmitted from the server apparatus 5, the drive link 10 decrypts, with the common key C, the common key D (step S513), and acquires the common key D (step S514). The CPU 11 of the drive link 10 stores the acquired common key D in the storage unit 13.

The drive link 10 encrypts, with the common key C, a receipt notification that the common key D has been received, and transmits the encrypted receipt notification to the server apparatus 5 via the terminal apparatus 3 (step S515). The server apparatus 5 decrypts, with the common key C, the receipt notification from the drive link 10 (step S516).

As described above, in the present embodiment, the server apparatus 5 compares the pairing information acquired from the terminal apparatus 3 with the pairing information acquired from the drive link 10, and as a result, it can be determined whether or not the combination of the terminal apparatus 3 and the drive link 10 is an authorized combination. Also, a configuration is adopted in which, if the combination of the terminal apparatus 3 and the drive link 10 is determined to be an authorized combination, the common key D that is common to the three devices is transmitted to the terminal apparatus 3 in a state in which the common key D is concealed from the drive link 10, and the common key D is also transmitted to the drive link 10 in a state in which the common key D is concealed from the terminal apparatus 3, and as a result, unauthorized rewriting of the common key D in a middle of the communication path can be prevented.

Note that a configuration may be adapted in which, if the server apparatus 5 determines that the combination of the terminal apparatus 3 and the drive link 10 is not the authorized combination, the server apparatus 5 encrypts, with the common key C, a notification that the communication with the terminal apparatus 3 should be cut off, and transmits the encrypted notification to the drive link 10. The drive link 10 decrypts, with the common key C, the notification, cuts off the communication with the terminal apparatus 3 according to the notification, and resolves the pairing, and as a result, unauthorized access to the inside of the vehicle 1 by an unauthorized program and the leakage of various pieces of information stored in the ECUs 50 inside the vehicle 1 to the outside can be prevented.

The embodiments disclosed herein are examples in all aspects, and should be considered to be not restrictive. The scope of the present invention is indicated not by the above-stated meanings but by the scope of claims, and is intended to include all modifications that are within the meanings and the scope that are equivalent to those of the scope of claims. Furthermore, the technical features described in the embodiments can be combined with each other.

For example, in the present embodiment, a configuration has been adopted in which the gateway 30 is connected to the drive link 10, and a plurality of ECUs 50 are connected to the gateway 30, but the configuration of this in-vehicle network is an example, and the configuration is not limited thereto. A configuration may be adopted in which the drive link 10 is configured to also have a function of the gateway, and a plurality of ECUs 50 are connected to the drive link 10. Also, any of the ECUs 50 may be configured to also have a function of the drive link 10. Also, a plurality of drive links 10 may be installed in the vehicle 1.

Also, in the present embodiment, a configuration has been adopted in which the drive link 10 and the terminal apparatus 3 are connected by wire to perform communication, but a configuration may be adopted in which wireless communication is performed using a wireless signal utilizing a medium such as a radio wave or light inside the vehicle 1 or inside a range in which the wireless signal can reach from the vehicle 1. In this case, the drive link 10 and the terminal apparatus 3 perform wireless communication conforming to a standard such as a wireless LAN (Local Area Network) or Bluetooth (registered trademark).

Also, in the case where the vehicle 1 is an electric car, and is configured to receive power from an external power supply apparatus via a power supply cable, the drive link 10 may be configured to perform communication with an external apparatus with power line communication via the power supply cable or the like.

The invention claimed is:

1. A communication system including a vehicle-mounted communication device connected to a communication network in a vehicle, a terminal apparatus detachably connected to the vehicle-mounted communication device, and a central apparatus that is connected to a communication network outside the vehicle and that can communicate with the terminal apparatus, wherein the vehicle-mounted communication device includes:
a means for storing a device ID for identifying the vehicle-mounted communication device;
a means for transmitting the device ID to the terminal apparatus; a means for acquiring, from the connected terminal apparatus, a terminal ID, the terminal ID for identifying the terminal apparatus; and
a means for transmitting the device ID and a terminal ID that was acquired from the terminal apparatus to the central apparatus via the terminal apparatus,
the terminal apparatus includes:
a means for storing a terminal ID for identifying the terminal apparatus;
a means for transmitting the terminal ID to the vehicle-mounted communication device;
a means for acquiring a device ID transmitted from the vehicle-mounted communication device; and
a means for transmitting the terminal ID and a device ID that was acquired from the vehicle-mounted communication device to the central apparatus, and
the central apparatus includes:
a means for receiving a device ID and a terminal ID that were transmitted from the vehicle-mounted communication device and a device ID and a terminal ID that were transmitted from the terminal apparatus; and
a comparison means for comparing the device ID and the terminal ID that were received from the vehicle-mounted communication device with the device ID and the terminal ID that were received from the terminal apparatus;
wherein the vehicle-mounted communication device and the central apparatus store a first common key that is shared between them,
the vehicle-mounted communication device includes a means for encrypting, with the first common key, the device ID and the terminal ID that are to be transmitted to the central apparatus,
the terminal apparatus and the central apparatus store a second common key that is shared between them,
the terminal apparatus includes a means for encrypting, with the second common key, the terminal ID and the device ID that are to be transmitted to the central apparatus, and
the central apparatus includes:
a means for decrypting, with the first common key, the device ID and the terminal ID that were received from the vehicle-mounted communication device; and
a means for decrypting, with the second common key, the terminal ID and the device ID that were received from the terminal apparatus.

2. The communication system according to claim 1,
wherein the central apparatus includes:
a generating means for generating, if it is determined by the comparison means that the device ID and the terminal ID that were received from the vehicle-mounted communication device match the device ID and the terminal ID that were received from the terminal apparatus, a third common key that is shared between the central apparatus, the terminal apparatus, and the vehicle-mounted communication device;
a means for encrypting, with the first common key, the third common key generated by the generation means;

a means for transmitting the third common key that was encrypted with the first common key to the vehicle-mounted communication device via the terminal apparatus;

a means for encrypting, with the second common key, the third common key generated by the generation means; and a means for transmitting the third common key that was encrypted with the second common key to the terminal apparatus.

3. The communication system according to claim 2, wherein the central apparatus includes:

a means for transmitting, if it is determined by the comparison means, that the device ID and the terminal ID that were received from the vehicle-mounted communication device do not match the device ID and the terminal ID that were received from the terminal apparatus, a notification that communication with the terminal apparatus should be cut off to the vehicle-mounted communication device via the terminal apparatus, and the vehicle-mounted communication device includes:

a means for cutting off, upon receiving the notification transmitted from the central apparatus, the communication with the terminal apparatus.

4. The communication system according to claim 1, wherein the central apparatus includes:

a means for transmitting, if it is determined by the comparison means, that the device ID and the terminal ID that were received from the vehicle-mounted communication device do not match the device ID and the terminal ID that were received from the terminal apparatus, a notification that communication with the terminal apparatus should be cut off to the vehicle-mounted communication device via the terminal apparatus, and the vehicle-mounted communication device includes:

a means for cutting off, upon receiving the notification transmitted from the central apparatus, the communication with the terminal apparatus.

5. A comparison method of comparing a vehicle-mounted communication device connected to a communication network in a vehicle with a terminal apparatus detachably connected to the vehicle-mounted communication device using a central apparatus that is connected to a communication network outside the vehicle and that can communicate with the terminal apparatus, wherein the vehicle-mounted communication device is configured to:

transmit a device ID for identifying the vehicle-mounted communication device to the terminal apparatus, acquire, from the connected terminal apparatus, a terminal ID for identifying the terminal apparatus, and transmit the device ID and a terminal ID that was acquired from the terminal apparatus to the central apparatus via the terminal apparatus, the terminal apparatus is configured to:

transmit a terminal ID for identifying the terminal apparatus to the vehicle-mounted communication device, acquire a device ID transmitted from the vehicle-mounted communication device, and transmit the terminal ID and a device ID that was acquired from the vehicle-mounted communication device to the central apparatus, and the central apparatus is configured to:

receive a device ID and a terminal ID that were transmitted from the vehicle-mounted communication device and a device ID and a terminal ID that were transmitted from the terminal apparatus, and compare the device ID and the terminal ID that were received from the vehicle-mounted communication device with the device ID and the terminal ID that were received from the terminal apparatus;

wherein the vehicle-mounted communication device is configured to encrypt, with a first common key that is shared with the central apparatus, the device ID and the terminal ID that are to be transmitted to the central apparatus, the terminal apparatus is configured to encrypt, with a second common key that is shared with the central apparatus, the terminal ID and the device ID that are to be transmitted to the central apparatus, and the central apparatus is configured to:

decrypt, with the first common key, the device ID and the terminal ID that were received from the vehicle-mounted communication device, and decrypt, with the second common key, the terminal ID and the device ID that were received from the terminal apparatus.

6. The comparison method according to claim 5, wherein the central apparatus is configured to:

generate, if, as a result of comparison, it is determined that the device ID and the terminal ID that were received from the vehicle-mounted communication device match the device ID and the terminal ID that were received from the terminal apparatus, a third common key that is to be shared between the central apparatus, the terminal apparatus, and the vehicle-mounted communication device, encrypt, with the first common key, the generated third common key, transmit the third common key that was encrypted with the first common key to the vehicle-mounted communication device via the terminal apparatus, encrypt, with the second common key, the generated third common key, and transmit the third common key that was encrypted with the second common key to the terminal apparatus.

7. The comparison method according claim 6, wherein the central apparatus is configured to transmit, if, as a result of comparison, it is determined that the device ID and the terminal ID that were received from the vehicle-mounted communication device do not match the device ID and the terminal ID that were received from the terminal apparatus, a notification that communication with the terminal apparatus should be cut off to the vehicle-mounted communication device via the terminal apparatus, and the vehicle-mounted communication device is configured to cut off, upon receiving the notification transmitted from the central apparatus, the communication with the terminal apparatus.

8. The comparison method according claim 5, wherein the central apparatus is configured to:

transmit, if, as a result of comparison, it is determined that the device ID and the terminal ID that were received from the vehicle-mounted communication device do not match the device ID and the terminal ID that were received from the terminal apparatus, a notification that communication with the terminal apparatus should be cut off to the vehicle-mounted communication device via the terminal apparatus, and the vehicle-mounted communication device is configured to cut off, upon receiving the notification transmitted from the central apparatus, the communication with the terminal apparatus.

* * * * *